March 14, 1950

E. P. DU PONT 2,500,168

VEHICLE SUPPORTED TOOL AND WHEEL
DRIVE CONTROL THEREBY

Filed Sept. 19, 1945

WITNESS:

Rht-R-Hitchel

INVENTOR

Eleuthere Paul du Pont
BY
Burnet Harding
ATTORNEYS.

Patented Mar. 14, 1950

2,500,168

UNITED STATES PATENT OFFICE 2,500,168

VEHICLE SUPPORTED TOOL AND WHEEL DRIVE CONTROL THEREBY

Eleuthere Paul du Pont, Montchanin, Del.

Application September 19, 1945, Serial No. 617,299

4 Claims. (Cl. 180—19)

This invention relates to an improvement in power plants, and more particularly to power plants which are periodically moved over a surface for supplying power to a power driven device, which device is continuously shifted by an operator during its operation, independent of the movement of the power plant.

One of the objects of my invention is to provide means requiring the minimum attention of the operator for driving the supporting wheels of the power plant to shift the plant, to follow up the operator as he progresses with the work performed by the power operated tool.

Another object of my invention is to provide means driven by the power plant for actuating the movable tool or power actuated device.

Referring to the accompanying drawings, in which I have shown one form of device in accordance with my invention, in which.

Figure 1:
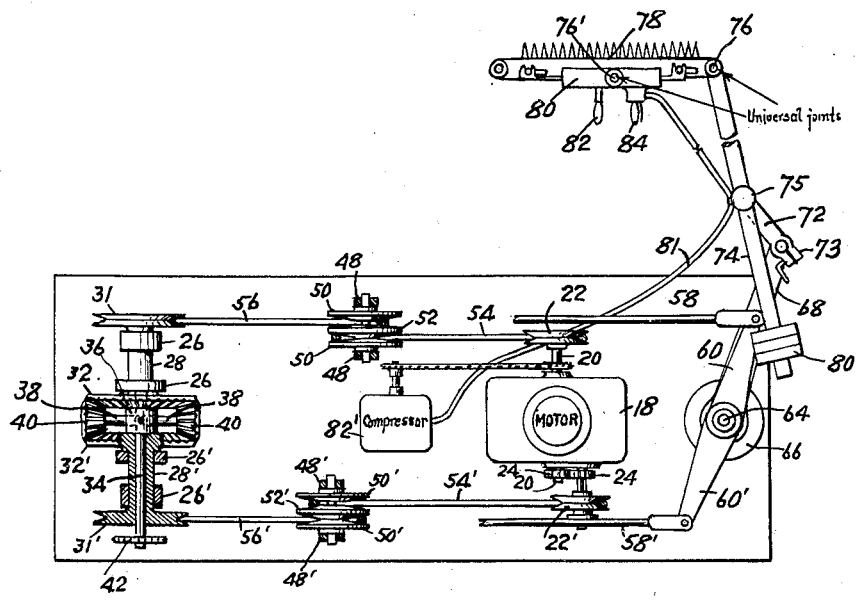
Fig. 1 is a diagrammatic plan view, partially in section, of a simple form of power plant.

In the drawings the plant is mounted on a cart having a supporting base or platform 10, which is mounted on wheels 12 and 14.

The wheels 12 are adjusted and locked in any desired manner to steer the cart along the line the plant is to be moved, while one of the other wheels 14 is provided with a sprocket wheel 16, which is driven as hereinafter described, to move the cart either forward or backward.

Mounted on the base 10 is a motor 18, having a shaft 20 extending outwardly on each side thereof, and directly connected to one end of the shaft 20 is a V pulley 22, and connected to the other end of said shaft through the medium of gears 24, 24 is a similar V pulley 22', the arrangement being such that the pulleys 22 and 22' are driven at the same speed but in reverse directions.

Mounted in bearings 26, 26, mounted on the base 10, is a shaft 28, and 28' is a similar shaft in axial alignment with shaft 28, mounted in similar bearings 26, 26'.

31 designates a V pulley connected to one end of shaft 28 and connected to the other end of shaft 28 is a bevel gear 32. The shaft 28', which is hollow for the purpose hereinafter described, is also provided with a V pulley 31' and a bevel gear 32'.

Extending through the shaft 28' is a shaft 34, which extends into a head 36 between the bevel gears 32 and 32' and is secured to said head to rotate therewith. Projecting radially from the head 36 and in axial alignment with each other are trunnions 38, and rotatable on each trunnion is a bevel pinion 40, which meshes with bevel gears 32 and 32', which form a differential for rotating the shaft 34 in one direction or the other if the speeds of the bevel gears 32 or 32' differ from each other in the well known manner.

Connected to the end of the shaft 34 is a sprocket wheel 42, which is connected by means of a sprocket chain 44 with sprocket wheel 16 to drive the same if shaft 34 is rotated as above described.

Rotatably mounted in bearings in a yoke 48 is a speed change pulley having fixed side flanges 50 and a central member 52, slidably mounted between the flanges 50 but rotatable therewith. The inner faces of the flanges 50, as well as both faces of the central member 52, are shaped to form a twin V pulley between adjacent flanges, one of which is connected to the pulley 22 on the motor shaft by means of a belt 54, while the other is connected to the pulley 31 on shaft 28 by means of a belt 56.

The driving connections between the motor and shaft 28 are such that when the yoke 48 is in a vertical position, belt 56 will be driven at the same speed as belt 54, and when the yoke 48 is moved to the right as shown in the drawings, the speed of belt 56 will be less than the speed of belt 54, for the purpose hereinafter described.

The driving connections between the motor shaft 28 on the other side of the motor are identical with the connections above described, and to which the same reference characters have been applied with ' added.

As illustrated in the drawings, the yoke 48' has been shifted to the left of the vertical position the same distance as the yoke 48 has been shifted to the right so that shaft 28' will be rotated at a higher speed than shaft 28, so the shaft 34 will be rotated through the medium of the differential gearing to drive wheel 14 to move the cart. If the yokes 48 and 48' are moved to a vertical or central position, the shafts 28 and 28' will be driven at the same speed so that the cart will be stationary.

The yokes 48 and 48' are shifted by means of connecting rods 58 and 58', respectively, which are connected thereto and to oppositely disposed cranks 60 and 60'. These cranks 60 and 60' are provided with a hub 62, rotatably mounted on a trunnion 64, extending upwardly from a support 66 mounted on the base 10 of the cart.

Extending laterally from the hub 62 is a third crank 68 having an upwardly extending arm 70, on which is adjustably mounted an arm 72 by means of connection 73 for supporting a tool carrying lever 74 which is connected thereto by a universal joint 75. Connected to one end of lever 74 by means of a universal joint 76 is a hedge cutting device 78 and mounted on the other end of lever 74 is a counterweight 80.

In the apparatus shown the cutter 78 is driven by a pneumatic motor 80, to which compressed air is supplied through an air line 81 from a compressor 82' which is driven by the motor 18.

82 and 84 designate handles on the motor 80 by means of which the operator is enabled to manipulate the cutter, while the handle 84 is connected to valve means in the motor casing for controlling the air supply to the motor.

Figure 3:
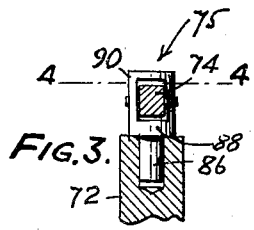
Fig. 3 is a detail sectional view of one of the universal joints.
Figure 4:
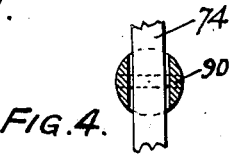
Fig. 4 is a sectional view on the line 4—4 of Fig. 3.
Figure 2:
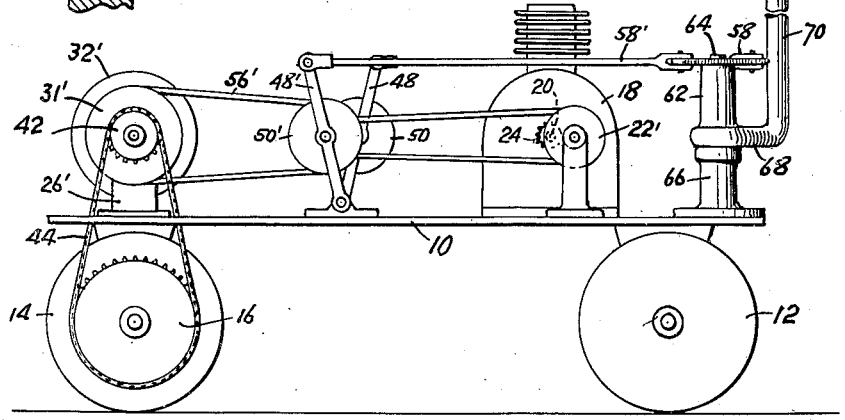
Fig. 2 is a side elevation thereof, from which some of the parts have been omitted for clearness.

Referring to Figs. 3 and 4, in which details of one form of a universal joint such as the joint 75 is illustrated. In these figures the upwardly extending portion of the arm 72 is bored out to form a bearing for a trunnion 86 extending downwardly from the base 88 of a yoke 90, in which the lever 74 is pivoted, so that the lever 74 is adapted to move freely about a horizontal, as well as a vertical axis, to permit the operator to properly manipulate the cutter 78 without shifting the cranks 60 and 60'.

The rotation of the motor 18 and the various connections are preferably such that the cart will be moved in the direction in which the operator shifts the end of arm 72 to which the shears 78 are attached.

The various parts in the drawing are shown in the position they occupy when the cart is being moved to the right or forward and, in order to stop the movement of the cart, the cranks 60 and 60' are shifted to shift yokes 48 and 48' to a vertical position so that both pulleys 30 and 30' are rotated at the same speed.

The lever 74 is free to move relative to the arm 72, and the tool or cutter 78 can be freely moved in various directions, while the tool can be driven by compressed air from the air compressor which is driven by the motor 18, which may be either an internal combustion engine or an electric motor.

Figure 6:
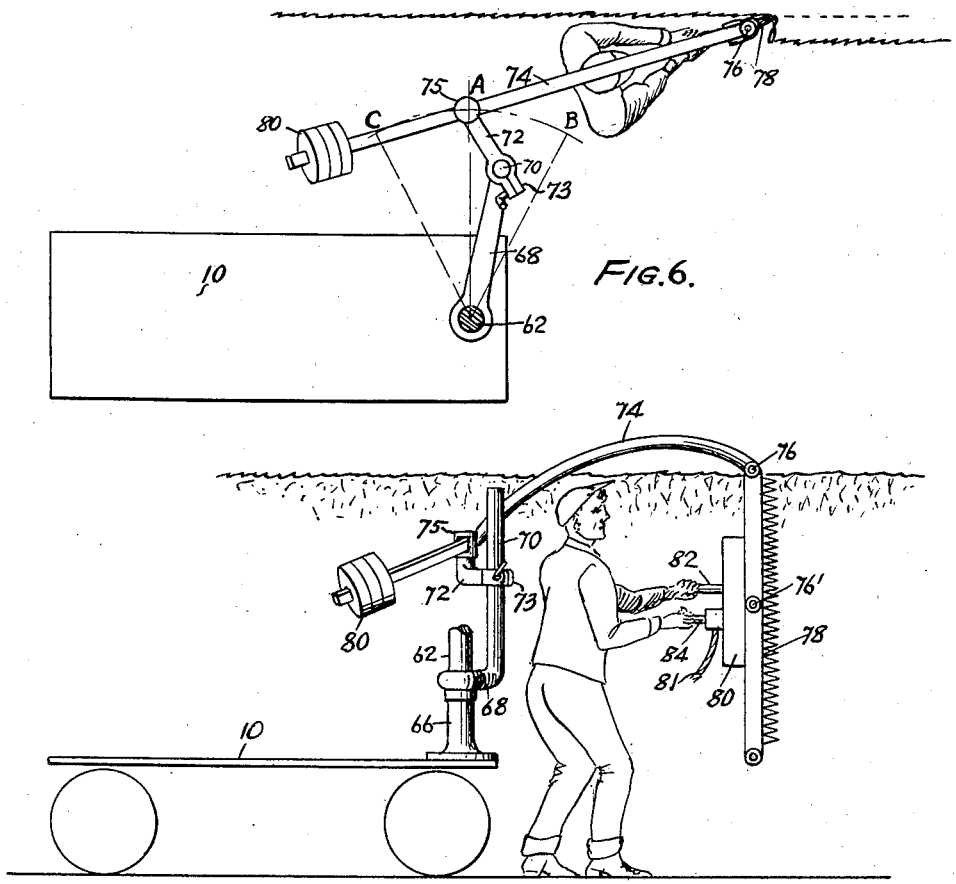
Fig. 6 is a plan view of the structure shown in Fig. 5.
Figure 5:
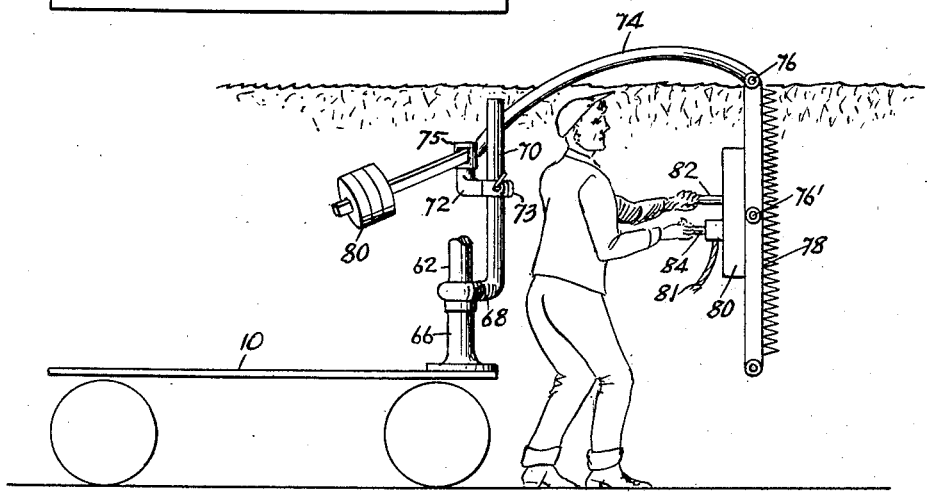
Fig. 5 is a side view in skeleton form showing the device when trimming the side of a hedge.

In Figs. 5 and 6 I have illustrated the device in skeleton form in which the operator is moving forward, while the apparatus follows the operator, and in which I have shown by broken lines the maximum positions to which the control crank 68 is shifted by the movement of arm 72. The driving connections from the motor to the driving wheels 14 are such that when the crank 68 is shifted to its extreme limit in either direction the speed of the cart will be substantially equal to a slow walk.

In Fig. 6 the broken line A designates the neutral position for the crank 68 or a position in which the yokes 48 are vertical, so that bevel gears 32 and 32' travel at the same speed, and the cart or power plant will be stationary.

When the crank 68 is moved to the position B and retained there, the cart will move forward at its maximum speed, and when moved to the position C and held there the cart will move in the reverse direction at full speed.

When the cutter is used for trimming the side of a hedge as shown in Figs. 5 and 6, one end of the cutter 78 is connected to the universal joint 76 and as the weight of the cutter is counterbalanced by the weight 80 on the opposite end of lever 74, the operator can guide the cutter as readily as he could guide a hand shear.

Figure 7:
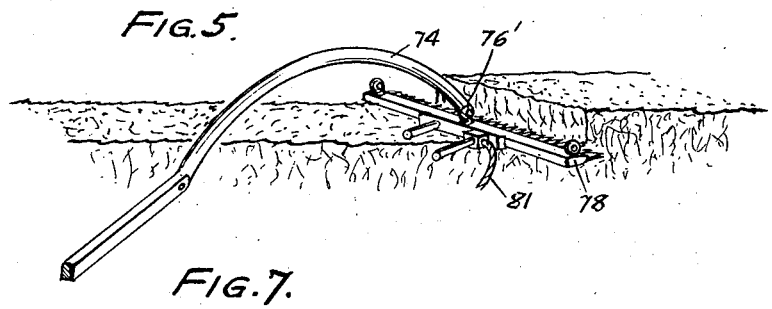
Fig. 7 is a perspective view showing the cutter when used for trimming the top of a hedge.

If it is desired to trim the top of a hedge, the universal joint 76 is disconnected from the end of the cutter and is connected to the center thereof at 76', so that the cutter will be balanced at the end of the lever 74, as shown in Fig. 7.

Assuming that the movement from C to B of the outer end of crank 68 is three feet, the operator can move the cutter through a three foot distance whether the power plant is moving or not.

As shown in Fig. 6, the operator has moved the crank 68 from A or the neutral position to a point between points A and B, so that power plant is following him very slowly and if he moves the cutter so as to shift the crank to the point B the plant will move at its highest speed or at a slow walk of the operator, and if he should stop or back up to trim the lower portion of the hedge below the cutter as shown, the movement of the power plant will be slowed up or stopped when the crank is shifted to the point A or moved in a reverse direction if shifted to a point between points A and C.

The advantages of my invention result from the provision of a movable power plant having supporting wheels, adapted to apply power to power-driven tools which are shifted from place to place, is geared to the supporting wheels and is provided with control means directly operable by the forward or backward movement of the operator remote from the power plant, whereby the operator may manipulate the control means to shift the position of the power plant along a predetermined path, as he progresses with the work done by the power-operated tool.

What I claim and desire to protect by Letters Patent is:

1. A vehicle supported tool and wheel drive control comprising differential gearing supported thereon having a driving shaft connected to a wheel of the vehicle, a driving motor, driving connections between the motor and differential gearing for driving a pair of members of the differential in opposite directions, driving connections between said members connected to the driving shaft, shiftable means for simultaneously reducing the speed of one of said driving connections while increasing the speed of the other to vary the speed of the wheel driving shaft, an oscillating member, actuating connections between said oscillating member and said shiftable means to control the speed of the driving shaft, a tool supporting bar mounted for universal movement on said oscillating member and a power driven tool pivoted for universal movement on the bar whereby the tool is arranged to be moved in varied directions to a limited degree without moving the oscillating member.

2. A device of the character described in accordance with claim 1 characterized in that means are provided on the tool supporting bar to counterbalance the tool.

3. A device of the character described in accordance with claim 1 characterized in that an element is provided for effecting the mounting of the supporting bar on the oscillating member, said element having a universal connection with said supporting bar and a vertically adjustable connection on said oscillating member.

4. A device of the character described in accordance with claim 1 characterized in that the driving connections between the motor and members of the differential gearing driven in opposite directions include a V-driving pulley on each side of the motor, a V-driven pulley on each of the oppositely driven members of the differential gearing, a yoke pivotally connected at its lower end between each pulley on the motor and the differential gearing, a composite double V-pulley having a sliding central flange mounted in each yoke between its ends, each driving pulley on the motor being connected to one of the driven members of the differential gearing by a belt extending from one side of the central flange to a V-pulley on the motor and a belt extending from the other side of the central flange to a V-pulley on one of the driven members on the differential, and a rod pivotally connected to the upper end of each yoke and the oscillating member, the pivotal connections of the yokes to the oscillating member being diametrically opposite to each other whereby the speed and direction of movement may be controlled by the movement of the tool.

ELEUTHERE PAUL DU PONT.

REFERENCES CITED

The following references are of record in the file of this patent:

UNITED STATES PATENTS

| Number | Name | Date |
| --- | --- | --- |
| 954,667 | Bielenberg | Apr. 12, 1910 |
| 1,539,186 | Heller | May 26, 1925 |
| 1,916,704 | Willett et al. | July 4, 1933 |
| 2,138,239 | Irgens | Nov. 29, 1938 |
| 2,161,357 | Kaplan | June 6, 1939 |
| 2,175,551 | Perry | Oct. 10, 1939 |